(No Model.)

C. C. P. McCORD.
VESSEL FOR COOKING.

No. 254,355. Patented Feb. 28, 1882.

Witnesses.
Franck L. Ouraud
L. L. Miller

Inventor.
C. C. P. McCord
per Chas. H. Fowler,
Attorney.

UNITED STATES PATENT OFFICE.

CHRISTOPHER C. P. McCORD, OF WALNUT GROVE, ARKANSAS.

VESSEL FOR COOKING.

SPECIFICATION forming part of Letters Patent No. 254,355, dated February 28, 1882.

Application filed December 15, 1881. (No model.)

*To all whom it may concern:*

Be it known that I, CHRISTOPHER C. P. MC-CORD, a citizen of the United States, residing at Walnut Grove, in the county of Independence and State of Arkansas, have invented certain new and useful Improvements in Stove-Vessels; and I do hereby declare that the following is a full, clear, and exact description of the same, reference being had to the annexed drawings, making a part of this specification, and to the letters and figures of reference marked thereon.

Figure 1:
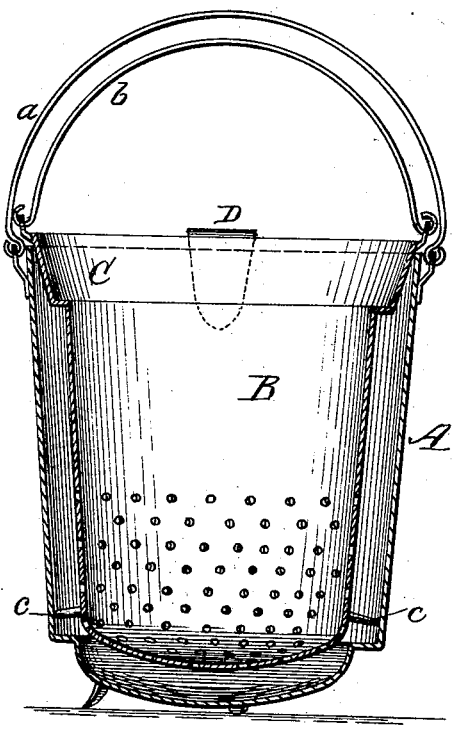
Figure 2:
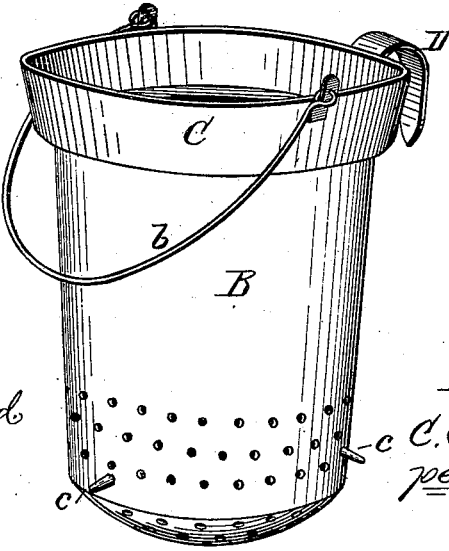

Figure 1 is a sectional elevation of my invention, and Fig. 2 a perspective view of the inner vessel.

The present invention has relation to that class of cooking utensils composed of two vessels, one within the other, the inner vessel being perforated and detachably or removably connected to the outer vessel or kettle.

The object of the above-mentioned class of culinary vessels is to prevent the fruit, vegetables, meats, and other articles of food from coming in contact with the outer vessel or kettle, and therefore avoid the danger of the food sticking, baking, or burning by thus being brought against the interior sides and bottom of said vessel or kettle.

The purpose of the present invention is to improve the construction of the above class of cooking utensils by adapting the inner vessel to be connected to any of the ordinary stove-kettles, and a space left between the two around the sides and bottom of the inner vessel; and the invention therefore consists, in connection with the ordinary stove-kettle, of an inner vessel of the construction substantially as shown in the drawings, and hereinafter described.

In the accompanying drawings, A represents a stove-kettle of the ordinary construction, having the usual bail, *a*. The inner vessel, B, which is perforated at its bottom and sides to any height desired, is different in construction from the perforated vessels heretofore in use, but, like the others, has connected to it a bail, *b*. The upper portion of the vessel B has an annular flaring extension, C, so that it will tightly fit at that point the varying sizes of kettles in use and leave a space between it and the vessel, as it is always desirable that the space be tightly closed.

At the sides of the vessel B, near its bottom, are radial knobs or pins *c*, which may be three or more in number, to prevent the sides or bottom of the vessel B from coming in contact with any portion of the interior of the kettle A; and it should here be noticed that if a flat continuous band or flange were used in place of the pins *c* the space between the kettle and vessel would be interrupted or closed at that point; but with the pins *c*, which project horizontally from the sides of the vessel B, a continuous and uninterrupted space is left around the entire outer surface of the vessel B and inner surface of the kettle A.

The pins *c* are not intended to rest upon the usual interior flange of the kettle, as might be supposed; but the ends of the pins only are brought in contact with the interior sides of the kettle, as shown in Fig. 1. The kettle A not having straight sides, but, on the contrary, slightly flaring, the pins will, by coming in contact with the sides, form or act, in connection with the flaring extension C, as a support for the vessel B, to retain it in position and prevent the extension C from being too tightly wedged against the inner sides of the kettle. Should this happen, however, I have provided the extension C with a curved handle, D, so that the extension can be loosened by taking hold of the handle and pressing in either direction horizontally. When the vessel B is placed within the kettle A, the handle being bent or curved in a downward direction, it extends over the rim of the kettle, and one lid will answer for both vessel and kettle.

Having now fully described my invention, what I claim as new, and desire to secure by Letters Patent, is—

The combination, with a suitable stove-kettle, A, of an inner perforated vessel, B, of less diameter than said kettle, and provided with a flaring extension, C, and radial pins *c*, extending from the sides of the vessel and adapted to come in contact with the interior sides of the kettle, whereby a continuous closed space is left around the entire outer surface of the vessel and inner surface of the kettle, substantially as and for the purpose set forth.

In testimony that I claim the above I have hereunto subscribed my name in the presence of two witnesses.

CHRISTOPHER COLUMBUS PORTER McCORD.

Witnesses:
SAMUEL M. PACE,
JAS. A. WILLIAMS.